United States Patent
Wild et al.

(10) Patent No.: US 9,858,702 B2
(45) Date of Patent: Jan. 2, 2018

(54) DEVICE AND METHOD FOR SIGNALLING A SUCCESSFUL GESTURE INPUT

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/118,454

(22) PCT Filed: Jan. 27, 2015

(86) PCT No.: PCT/EP2015/051555
§ 371 (c)(1),
(2) Date: Aug. 11, 2016

(87) PCT Pub. No.: WO2015/121056
PCT Pub. Date: Aug. 20, 2015

(65) Prior Publication Data
US 2017/0243389 A1    Aug. 24, 2017

(30) Foreign Application Priority Data
Feb. 12, 2014   (DE) .................. 10 2014 202 490

(51) Int. Cl.
| | |
|---|---|
| *G06T 13/80* | (2011.01) |
| *G06F 3/01* | (2006.01) |
| *B60K 35/00* | (2006.01) |
| *G06T 11/60* | (2006.01) |
| *G06T 11/00* | (2006.01) |

(52) U.S. Cl.
CPC .............. *G06T 13/80* (2013.01); *B60K 35/00* (2013.01); *G06F 3/017* (2013.01); *G06T 11/001* (2013.01); *G06T 11/60* (2013.01); *B60K 2350/1052* (2013.01); *B60K 2350/1064* (2013.01)

(58) Field of Classification Search
None
See application file for complete search history.

(56) References Cited

U.S. PATENT DOCUMENTS

| | | |
|---|---|---|
| 2008/0178126 A1 | 7/2008 | Beeck et al. |
| 2009/0027332 A1 | 1/2009 | Cieler et al. |
| 2009/0278915 A1 | 11/2009 | Kramer et al. |

(Continued)

FOREIGN PATENT DOCUMENTS

| | | |
|---|---|---|
| DE | 102006037156 A1 | 9/2007 |
| DE | 102011053449 A1 | 3/2012 |

(Continued)

OTHER PUBLICATIONS

International Search Report and Written Opinion for PCT/EP2015/051555 dated Aug. 20, 2015; 5 pages.

*Primary Examiner* — Nicholas Lee
(74) *Attorney, Agent, or Firm* — Loza & Loza, LLP; Peter Zura

(57) ABSTRACT

A device and a method for signaling a successful gesture input by means of a user. A user gesture is sensed and classified by a processing device. In response to the classified gesture, an animation may be generated that visually emphasizes a position that can change linearly at least in certain parts, along an edge of a screen assigned to the gesture input.

19 Claims, 10 Drawing Sheets

(56) References Cited

U.S. PATENT DOCUMENTS

| | | |
|---|---|---|
| 2012/0119991 A1 | 5/2012 | Tsai |
| 2012/0131518 A1 | 5/2012 | Lee et al. |
| 2012/0260212 A1 | 10/2012 | Young et al. |
| 2014/0013279 A1 | 1/2014 | Mongia et al. |

FOREIGN PATENT DOCUMENTS

| | | |
|---|---|---|
| DE | 102011121746 A1 | 7/2012 |
| DE | 102012000201 A1 | 7/2013 |
| DE | 102011116122 A1 | 6/2015 |
| EP | 1645944 A1 | 4/2006 |

DEVICE AND METHOD FOR SIGNALLING A SUCCESSFUL GESTURE INPUT

RELATED APPLICATIONS

The present application claims priority under 35 U.S.C. §371 to International PCT Application No. PCT/EP2015/051555 to Holger Wild et al., titled "Device and Method for Signaling a Successful Gesture Input" filed Jan. 27, 2015, which is incorporated by reference in its entirety herein.

TECHNICAL FIELD

The present disclosure relates to a device and a method for signaling a successful gesture input. In particular, the present disclosure relates to the generation of such signaling, which, regardless of a function executed in response to the gesture, allows for fast and intuitive feedback to the user. In the context of the present disclosure, gestures, particularly gestures performed with no contact, are acknowledged.

BACKGROUND

In the prior art, it is known to provide feedback to users on inputs, that may be entered by a user via a man-machine interface (HMI, Human Machine Interface). For example, feedback may be provided to a user pressing a button by briefly changing the display of the button and/or by a click sound that is output via an acoustic transducer. However gestures involving no contact (e.g., gestures taking place freely in space, with no contact to an input device, 3D gestures), little to no general signal forms for signaling successful inputs have emerged.

DE 10 2011 053 449 A1 describes a gesture-based man-machine interface for vehicles in which gestures, directed at a display element, of users are recognized. Here it is proposed to present a visual symbol or a pointer on the display to provide the user with a visual cue as to the position of the current input focus in an input. In addition, proposals are made on how to emphasize buttons designated by means of gesture input with respect to other screen contents.

DE 10 2012 000 201 A1 discloses methods and devices for zooming functions displayed on a display unit of a vehicle using gestures carried out in three-dimensional space. To train the user in terms of gesture operation of the device, it is proposed to display a window on a display, which indicates sensing a first predetermined gesture. The window also shows operating directions for further inputs.

In the case of vehicle-based gesture feedback, it is important to have feedback with low levels of distraction, while providing the requisite feedback to ensure traffic safety, particularly for HMIs. Also, information displayed on a display apparatus may be relevant to driving safety and should be hidden by the acknowledgment of a user input as little as possible. Accordingly, there is a need in the art to satisfy these, and related features in the art.

SUMMARY

In some illustrative embodiments, apparatus systems and methods are disclosed for signaling a successful gesture input by a user. The gesture input can be carried out, for example, as a non-contact ("free in space") gesture. For signaling a successful recognition of such a gesture, the gesture of the user should be detected by sensors. Subsequently, the gesture is classified, wherein, for example, a main direction of motion and/or a hand orientation or the like are recognized and compared with predefined references. As a result, the gesture is categorized as one that comes closest to the references. In some illustrative embodiments, the determined class ("the result of categorization") may be signaled by generating an animation, which visually emphasizes a changeable position, which can change linearly at least in certain parts along an edge of a screen assigned to the gesture input. For example, the screen can be part of a mobile electronic device (e.g., a tablet computer, a smart phone, a PDA or the like). Alternatively, a display element permanently installed in a means of transport such as a vehicle may serve as screen according to the present disclosure. Such display elements may be centrally installed in the dashboard, or as an instrument cluster in the area behind the steering wheel. The animation can be output either on the screen itself or in the area of at least an edge of the screen. It can include a trajectory configured linearly at least in certain parts or completely. In addition, several animations can be used, wherein their directions of motion may be oriented parallel, anti-parallel or perpendicular to each other. The use of animations displayed in the peripheral area of the screen under the present disclosure allows for signaling the successful recognition without increased distraction potential for the user regardless of a function started by the gesture.

BRIEF DESCRIPTION OF THE DRAWINGS

Exemplary embodiments of the invention are described in detail below with reference to the accompanying drawings. In the drawings.

DETAILED DESCRIPTION

Figure 1:
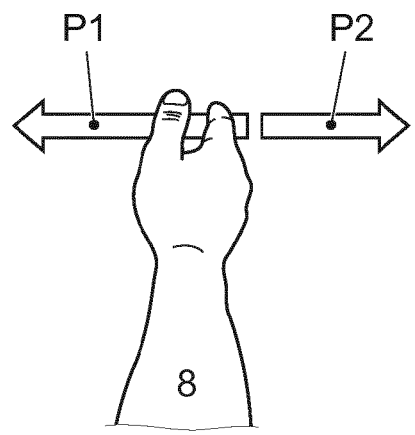
FIG. 1 is a schematic representation of a first gesture that can be signaled according to an illustrative embodiment.

In certain illustrative embodiments, each recognized gesture class may be configured with a predefined trajectory for the corresponding animation, or an emphasized position may be predefined for each gesture class. In particular, a main direction of motion of the animation may be oriented parallel to the edge of the screen assigned to the gesture input. Even a merely proportionate passing over the length of the respective edge is possible. For example, for a negative feedback, in the event that the recognized gesture cannot trigger any function, there is a possible trajectory from which the emphasized position is changed only up to a predetermined position in the peripheral area in a first direction, and then stops or returns on the same way in the opposite direction.

In some illustrative embodiments, the predefined trajectory may not be determined by the actual shape of the gesture that has been carried out, as is sometimes suggested in the prior art, but is tied to the main direction of motion. As the predefined trajectory is may be always configured identically and always comparably, signaling the determined class can be interpreted by the user particularly fast, resulting in a minimization of distraction for the driver of a vehicle. Technologies and techniques disclosed herein can also minimize uncertainty for a driver, particularly when the driver is unsure whether a gesture was successfully recognized or not. Accordingly, driving safety can be increased significantly over known systems for gesture input. In this example, because the evaluation and classification of the gesture is carried out using only the main direction of motion, a particularly short latency can be realized.

In some illustrative embodiments, the classification may be carried out at least with respect to a main direction of motion of the gesture. For example, this can be defined with respect to an orientation of the sensor used and/or with respect to the screen that is used, as "vertical", "horizontal", or into or out of the display level of the screen. While vertical and horizontal gestures may also be considered "swipe gestures", motions in a direction perpendicular to the surface of the screen may be considered "input" or "click" gestures. Alternatively or in addition, the signaling may take place along a trajectory predetermined by the main direction of motion defined by the determined class. In other words, the animation "runs" in a direction corresponding to the main direction of motion of the gesture provided a vertical or a horizontal swipe gesture has been detected and classified. As a result of the animation, there will be a type of tail for the hand of the user (or of an alternative means of input) when carrying out the gesture. In case of an absence of such a tail, the user knows immediately that the sensor system used was not able to sense the gesture, or the evaluation logic that was used was not able to clearly classify the gesture. The aforementioned configuration allows for a particularly intuitively detectable meaning of the signaling.

In some illustrative embodiments, the animation relating to the function(s) to be influenced by the gesture may be displayed. In this case, the animation may be displayed by pixels of the same screen that are located in the peripheral area of the pixel matrix. Alternatively or in addition, separate light-emitting elements, arranged adjacent to the screen, can be used that may include a respective illuminant or several illuminants. To construct an animation according to the disclosure, a respective illuminant of the light-emitting elements may be supplied with electrical energy for visually emphasizing a respective changeable position. The impression of a tail accompanying the gesture of the user can also be generated in this case, i.e., through a sequential supplying of energy. In this case, the light-emitting elements can be oriented, in particular, parallel to respective edges of the screen. To emphasize the relation of the light-emitting elements relative to the screen, the distance between the light-emitting elements and the screen should be as small as possible and should not exceed, in particular, a distance of 5 cm, preferably 2 cm, and very preferably 1 cm. This allows for an even easier intuitive interpretation of the signaling.

In some illustrative embodiments, the animation may include an area of increased brightness, which visually emphasizes the changeable position. The brightness can be due to a color change of a pixel/illuminant, change in optical intensity or brightness of each pixel/illuminant, or the like. In particular, this measure can be embedded in a visually appealing configuration. Furthermore, for better optical traceability of the animation areas that have been traversed by the position, it is possible for these areas to have an optical afterglow, decreasing in the manner of a comet's tail or in the manner of a vapor trail of an airplane. This facilitates the implementation of very narrow animated shapes, still having great visual perceptibility, by using only a small percentage of the display area of the screen. Using an optical afterglow may advantageously provide an improved visual recognizability of the animation. In this way, on the one hand, the utilization of the available screen space is improved, and, on the other hand, the distraction potential due to the signaling according to the invention of other screen contents is decreased.

In some illustrative embodiments, the animation may have an extension that is less than one fifth, particularly less than one seventh, preferably even less than one ninth of the length of the screen perpendicular to the direction of the course of the animation. Such a narrow animation design may be configured to cover only very few other display elements on the screen. If separate light-emitting elements are used for the display of the animation, they require very little space in the area arranged around the screen (e.g., a housing, an instrument panel, or the like).

Although the animation according to present disclosure may be carried out regardless of the fact of whether an application-related function can be executed in response to the recognized gesture or not, the animation can be configured differently depending on this fact. In this way, it is possible, on the one hand, to signal the user the correct recognition of the performed gesture and, on the other hand, to let the user know that inputting the same gesture again cannot launch the intended function of the HMI (e.g., scrolling through a list/sequence). In this way, regardless of the various visual feedback used for launching a function, uniform signaling can be generated in terms of as to whether the performed gesture has basically been recognized successfully and as to whether it has caused the launch of a function.

A distinction between a successful launch and an unsuccessful launch attempt of a function associated with the recognized gesture in this example can be realized by using a first color scheme for the animation and/or by a predefined trajectory for the animation. In one example, a blue or a green color scheme of the animation can symbolize a successful function call and/or have a trajectory following substantially an entire length of an edge of the screen. In contrast, in the event that an application-related function cannot be executed (e.g., because such a gesture is not associated with any such function or the end of a sequence selectable by a swipe gesture has been reached), the animation can be executed by a second color scheme (e.g., gray, red, or the like), and, alternatively or in addition, an optical differentiation of the animation may be achieved by another (e.g., second) trajectory that is different from the first trajectory. The other trajectory can be differentiated from the first trajectory, for example, in that the animation stops at a predefined position or reverses its running direction. In this way, the user receives a visual cue that the gesture has been recognized as a swipe gesture, but a desired function call associated with this swipe gesture could not take place. The position at which the animation reverses may be, for example, the center of the subject edge.

According to some illustrative embodiments, a device is disclosed that may include a first display unit, a sensor system and an evaluation unit. The first display unit can be understood either as a screen or as a light-emitting element. The sensor system may be set up for recognizing user gestures freely carried out in space. It can include, for example, an infrared LED array, the light of which is reflected by the hand of the user and sensed by suitable sensors. The evaluation takes place in the evaluation unit, which can be configured, for example, as an electronic controller. Such controllers may include programmable processors whose processing power is used by different instances of an electronic device or an on-board network. The sensor system may be configured to sense a gesture of a user at least when it is executed as 3D gesture within a predefined spatial region. The evaluation unit can classify the gesture and compare the sensed signals with stored references. After classifying, the first display unit may signal the determined class according to the method, as described above, by generating an animation, which visually emphasizes a at least in certain parts linearly changeable position. The features, combination of features and the resultant benefits are corresponding to those described elsewhere herein.

In some illustrative embodiments, the first display unit may include a screen for displaying animations and other features. In this example, the position, which can change linearly, can be displayed along at least one edge of the screen. Alternatively or in addition, further display units can be arranged around the screen, which may be configured for displaying additional animation. For example, any of the edges of the screen can be surrounded by another display unit in the form of a bar comprising at least an illuminant. Possible illuminants include, for example, individual LEDs, the light emission of which is distributed, for example, by an optical diffuser as surface of the illuminant. In this way, a corona can be generated around the optically emphasized position (the activated illuminant). The result is a visually unobtrusive light distribution, which distracts the driver as little as possible from the task of driving.

According to some illustrative embodiments, a computer program product (e.g., a data memory) is proposed where instructions are stored, which enable a programmable processor to carry out the steps of a method according to the present disclosure. The computer program product can be configured as a CD, DVD, Blue-Ray disc, flash memory, hard drive, RAM/ROM, cache, etc.

According to some illustrative embodiments, a signal sequence representing tangible computer instructions is proposed, which enable a programmable processor (for example, an evaluation unit of a device) to perform the steps of a method according to the present disclosure. In this way, the providing of instructions by information technology means is contemplated herein.

According to some illustrative embodiments, a means of transport (e.g., a vehicle, an airplane, or the like) is proposed, that includes a device according to the present disclosure. In this case, the device may be provided, in particular, for the operator of the means of transport and by means of which the operator can communicate with the means of transport and related technical equipment while operating the means of transport. The features, combination of features and the resultant benefits are corresponding to those described in connection with the present disclosure.

FIG. 1 illustrates a plurality of options of classes recognized according to the present disclosure for 3D gestures carried out by means of a hand 8 of a user. A first arrow P1 symbolizes a horizontal swipe gesture to the left, while a second horizontal arrow P2 represents a horizontal swipe gesture to the right. In this example, the back of the hand of the user is oriented substantially vertically.

Figure 2:
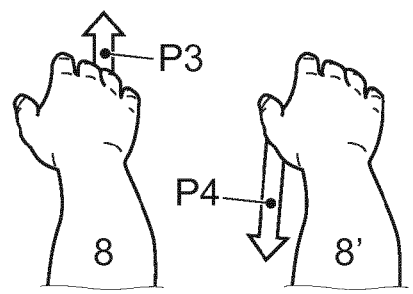
FIG. 2 is a schematic representation of a second gesture that can be signaled according to an illustrative embodiment.

FIG. 2 illustrates another plurality of classes of gestures recognized according to the present disclosure of a user's hand 8, 8', wherein a first arrow P3 represents a vertical swipe gesture upward and a second vertical arrow P4 represents a vertical swipe gesture downward. In this example, the back of the user's hand is oriented substantially horizontally.

Figure 3:
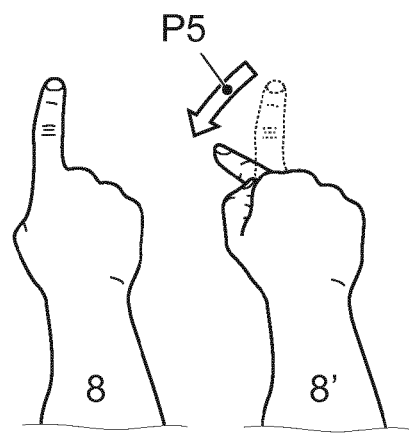
FIG. 3 is a schematic representation of a third gesture that can be signaled according to an illustrative embodiment.

FIG. 3 illustrates another class of recognizable gestures according to the present disclosure of a user's hand 8, 8'. Starting from the hand position illustrated on the left side of the picture with the index finger pointing upward, the user taps, following the arrow P5 in the air, by angling the user's index finder in a horizontal position. In FIG. 3, it is to be noted that additional classifications for "tap gestures" or "input gestures" set forth in the prior art are contemplated in the present disclosure and should be considered recognizable and classifiable in the context of the present disclosure.

Figure 4:
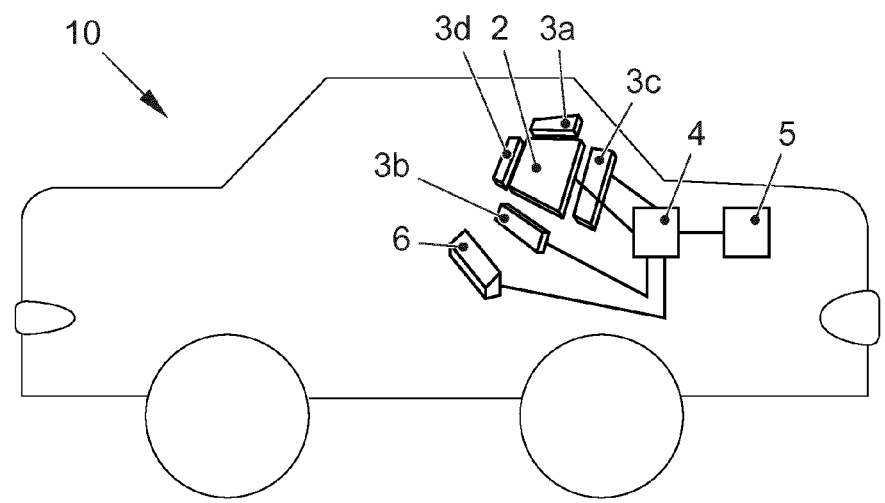
FIG. 4 is a schematic overview of components of an exemplary embodiment of a means of transport according to the present disclosure.

FIG. 4 shows a vehicle 10 as a means of transport in which there is provided a device according to the present disclosure for signaling a successful gesture input. In this example, a screen 2 is installed in the dashboard of vehicle 10 as a central display unit. The four edges of the rectangular screen 2 are surrounded by light-emitting elements 3a, 3b, 3c, 3d, surrounding the edges almost completely. These bar-shaped light-emitting elements 3a, 3b, 3c, 3d contain illuminant strips (not shown). For signaling of animations, the bar-shaped light-emitting elements 3a, 3b, 3c, 3d and the screen 2 are connected, by information technology means, to an electronic controller 4 as an evaluation unit. The electronic controller 4 includes a processor (not shown) and may also be connected by information technology means to a flash memory 5 as a data memory for references usable in classification. In addition, an infrared LED strip 6 may be provided as a sensor system and set up to provide its sensor signals to the electronic controller 4. Thus, gestures by the user, sensed via the infrared LED strip 6, can be classified by the electronic controller 4 by means of references stored in flash memory 5, and they can be visually signaled to the driver of vehicle 10 via animations on the screen 2 and the bar-shaped light-emitting elements 3a, 3b, 3c, 3d.

Figure 5:
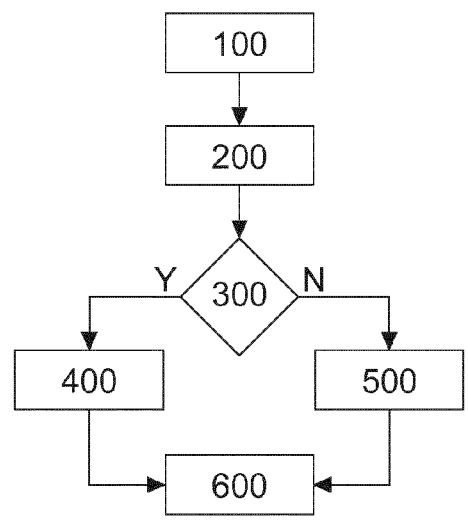
FIG. 5 is a flow chart illustrating steps of an exemplary embodiment of a method according to the present disclosure.

FIG. 5 shows a flow chart illustrating steps of a method according to an illustrative embodiment. In step 100, a gesture by the user is sensed. In step 200, the gesture is classified, and in step 300 it is decided whether the classified gesture can trigger, considering the operational state of the device (or an affiliated data processing device), a function call. If a function call (Y) can take place, the successful function call is signaled in step 400 by using a first color scheme of the animation and using a first trajectory for the animation. If the function call is not possible (N) with the classified gesture, in step 500, a second color scheme is used in conjunction with a second trajectory (different from the first trajectory) for providing corresponding feedback to the user. After signaling the successfully recognized gesture, the method ends in step 600.

Figure 6:
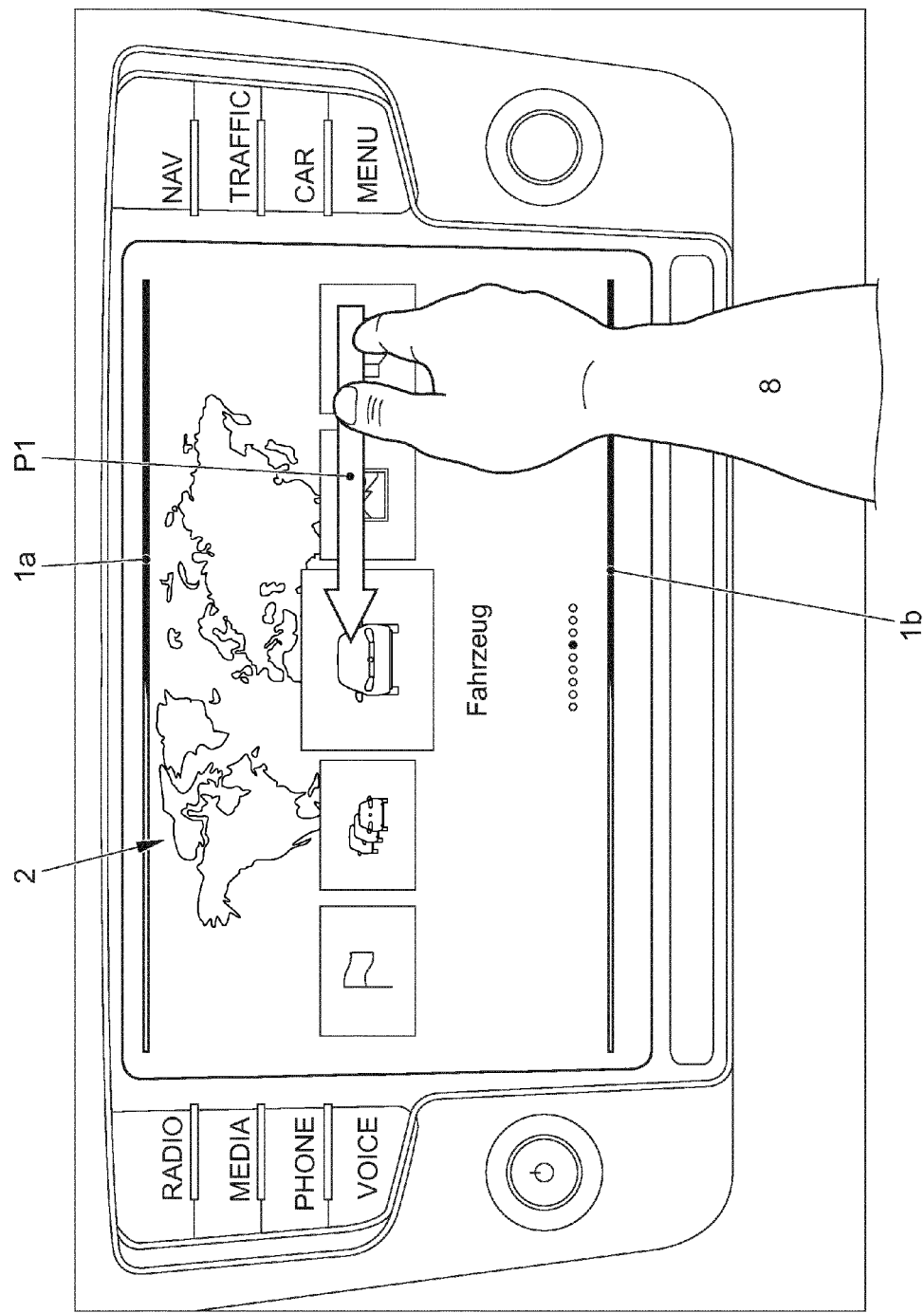
FIG. 6/
Figure 7:
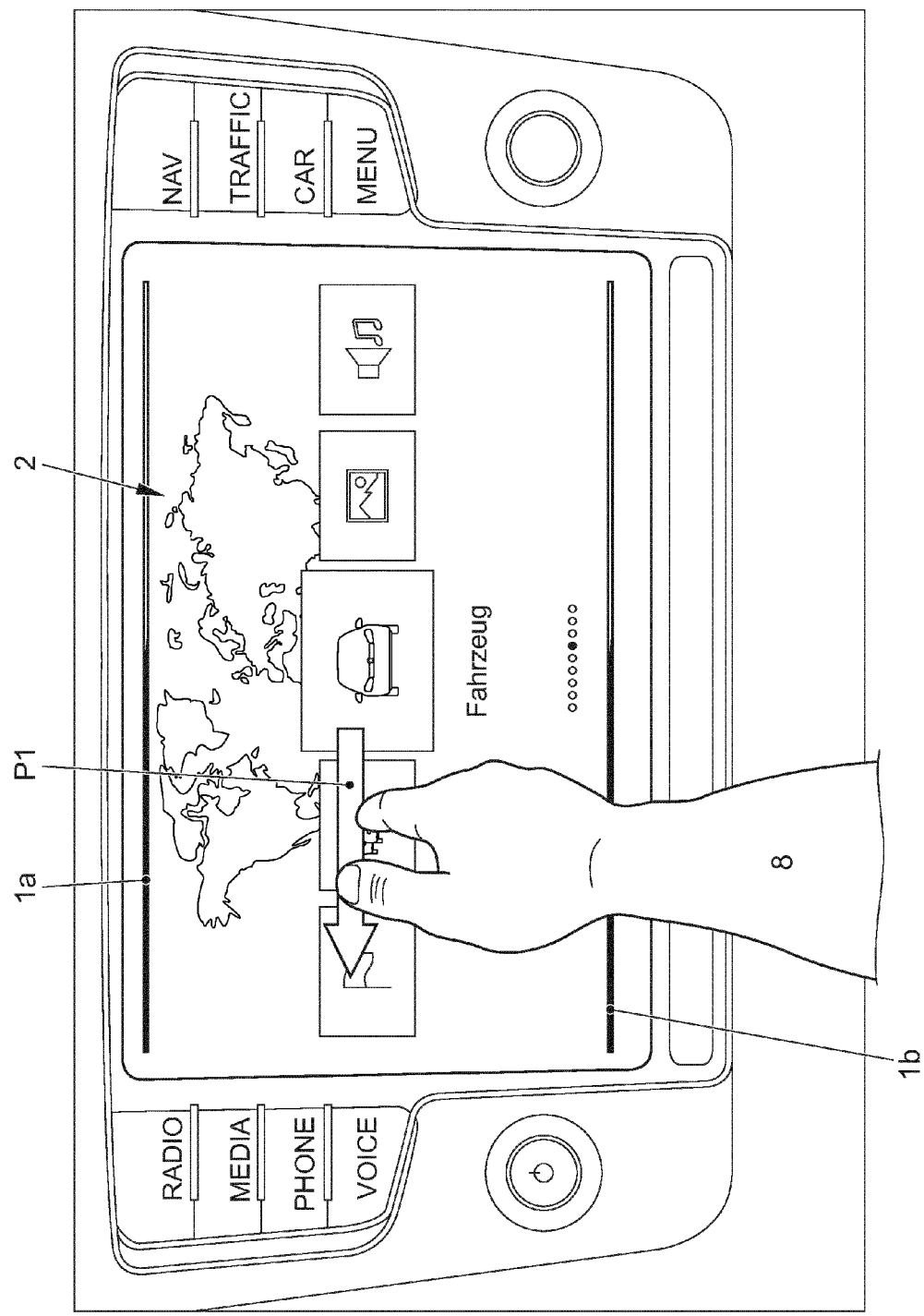
FIG. 7 is an illustration of an operating step of a successful function call by a gesture signaled according to an illustrative embodiment.

Signaling a successful swipe gesture to the left is illustrated in conjunction with FIGS. 6 and 7. The swipe gesture is performed by the hand 8 of a user in front of a screen 2 as a display unit of a vehicle. The direction of the swipe gesture is illustrated by the arrow P1. Along the upper edge of the screen 2 and along the lower edge of the screen 2, positions 1a, 1b which can change linearly, are visually emphasized by a narrow area of increased brightness (also referred to as "glow"). By the position at the top and bottom of the screen 2, the gesture is signaled as a horizontal swipe gesture. In response to the change in position of the hand 8 of the user from FIG. 6 to FIG. 7, the horizontal swipe gesture will be classified as "oriented to the left". As the swipe gesture is intended for facilitating a selection of functional groups displayed on screen 2 (not shown) and is acknowledged by a corresponding function call, the classified gesture is signaled in some illustrative embodiments by a first trajectory and color scheme via the emphasized position 1a having linearly followed the hand 8 of the user along the upper edge of screen 2. The same applies to the animation of the second visually emphasized position 1b running along the bottom of screen 2. The emphasis of the positions 1a, 1b is achieved by a blue color and increased brightness (not shown in the figures).

Figure 8:
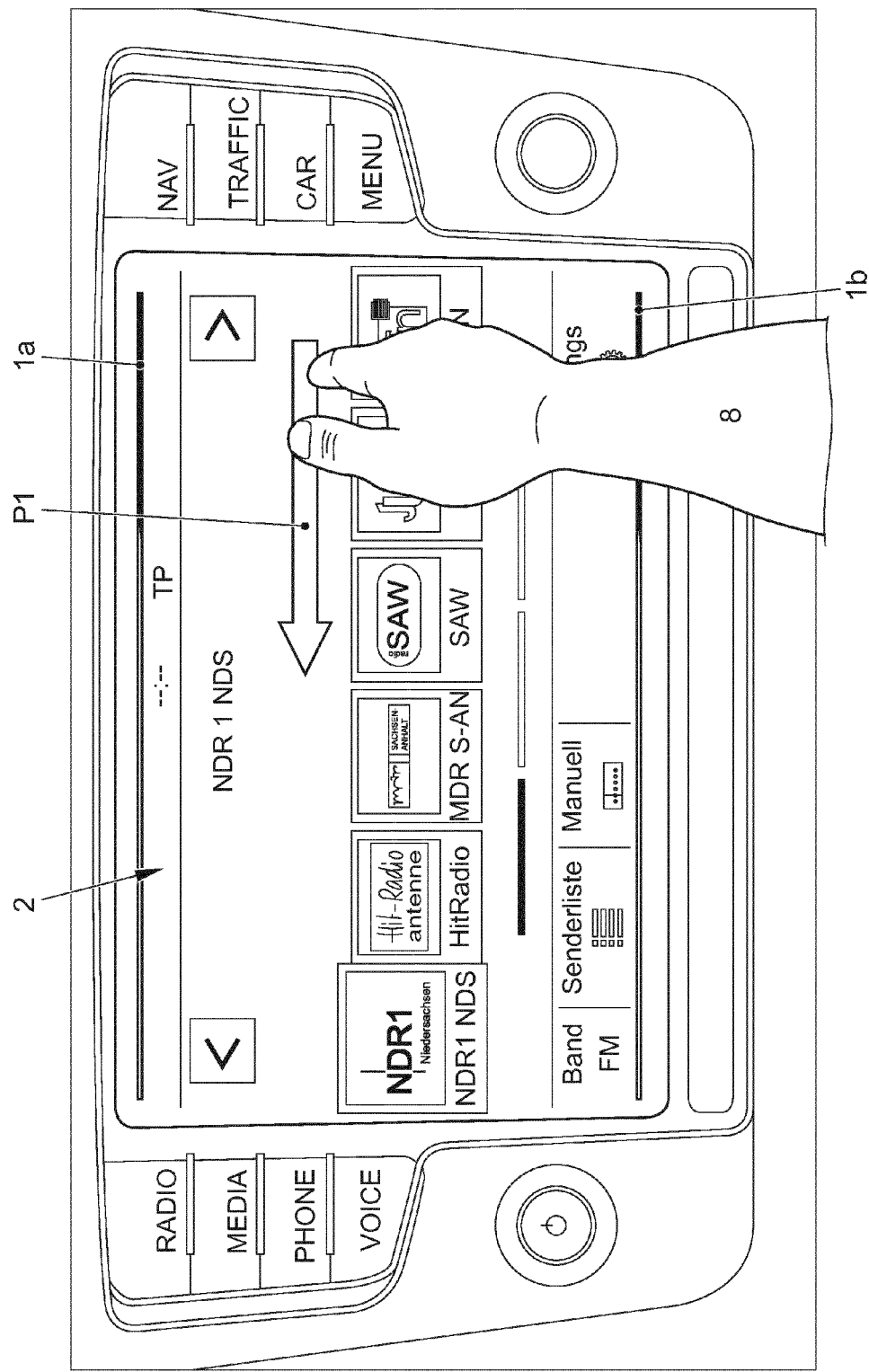
FIG. 8/
Figure 9:
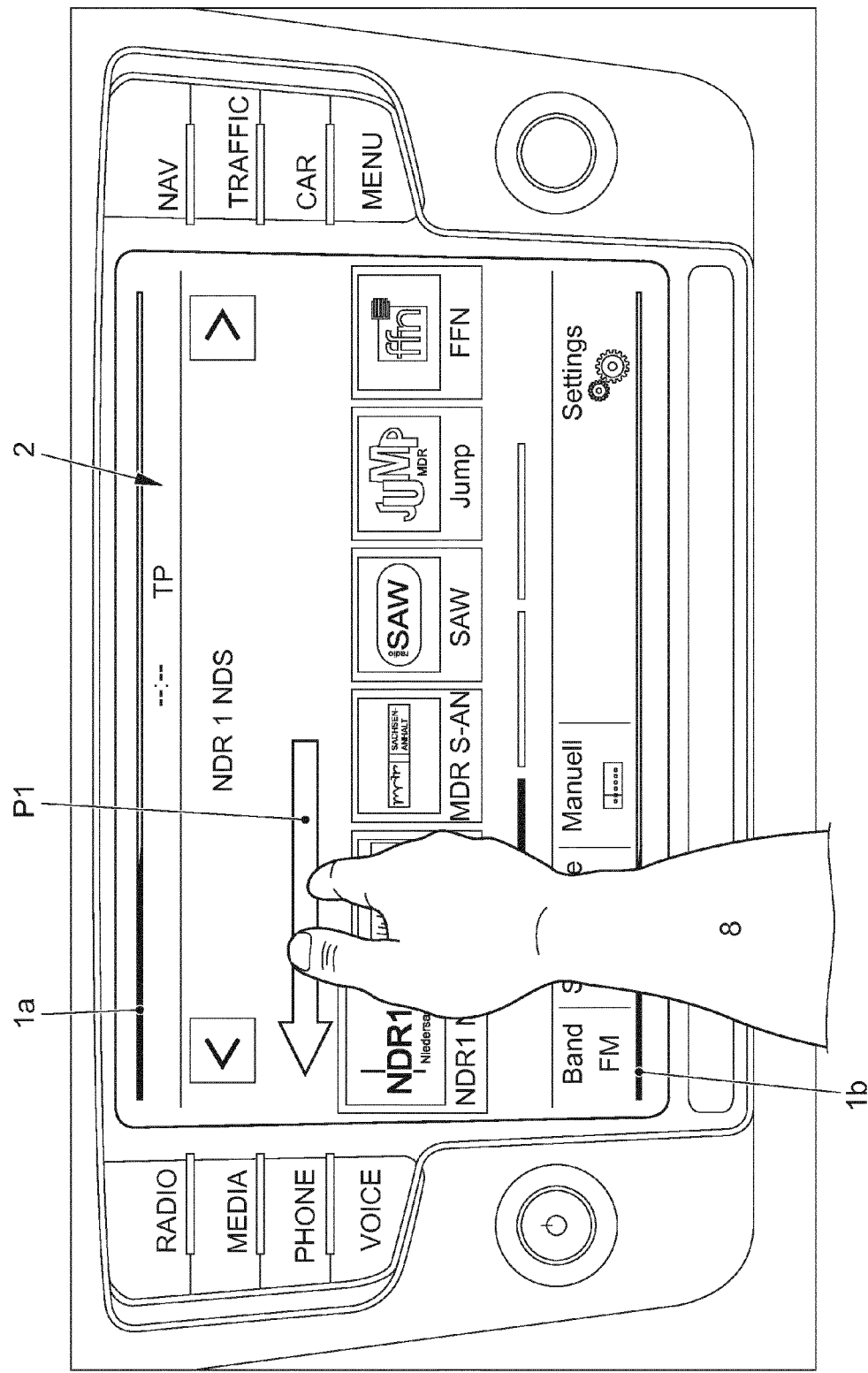
FIG. 9 is an illustration of an operating step of an unsuccessful function call by a gesture signaled according to an illustrative embodiment.

FIGS. 8 and 9 illustrate a gesture of the hand 8 of the user corresponding to FIGS. 6 and 7 but in the context of a changed content of screen 2. No wiping gesture P1 is provided for operating this screen content in this example. Contrary to the positions 1a, 1b displayed in FIGS. 6 and 7, the positions 1a, 1b in FIGS. 8 and 9 are shown with a gray color scheme. In this way, the successful recognition of his swipe gesture P1 is displayed to the user but, at the same time, also the failure of the function call that is intended by this swipe gesture, is indicated. Hence, the user will not find his error in the gesture input itself, but in the controlling function of the displayed menu.

Figure 10:
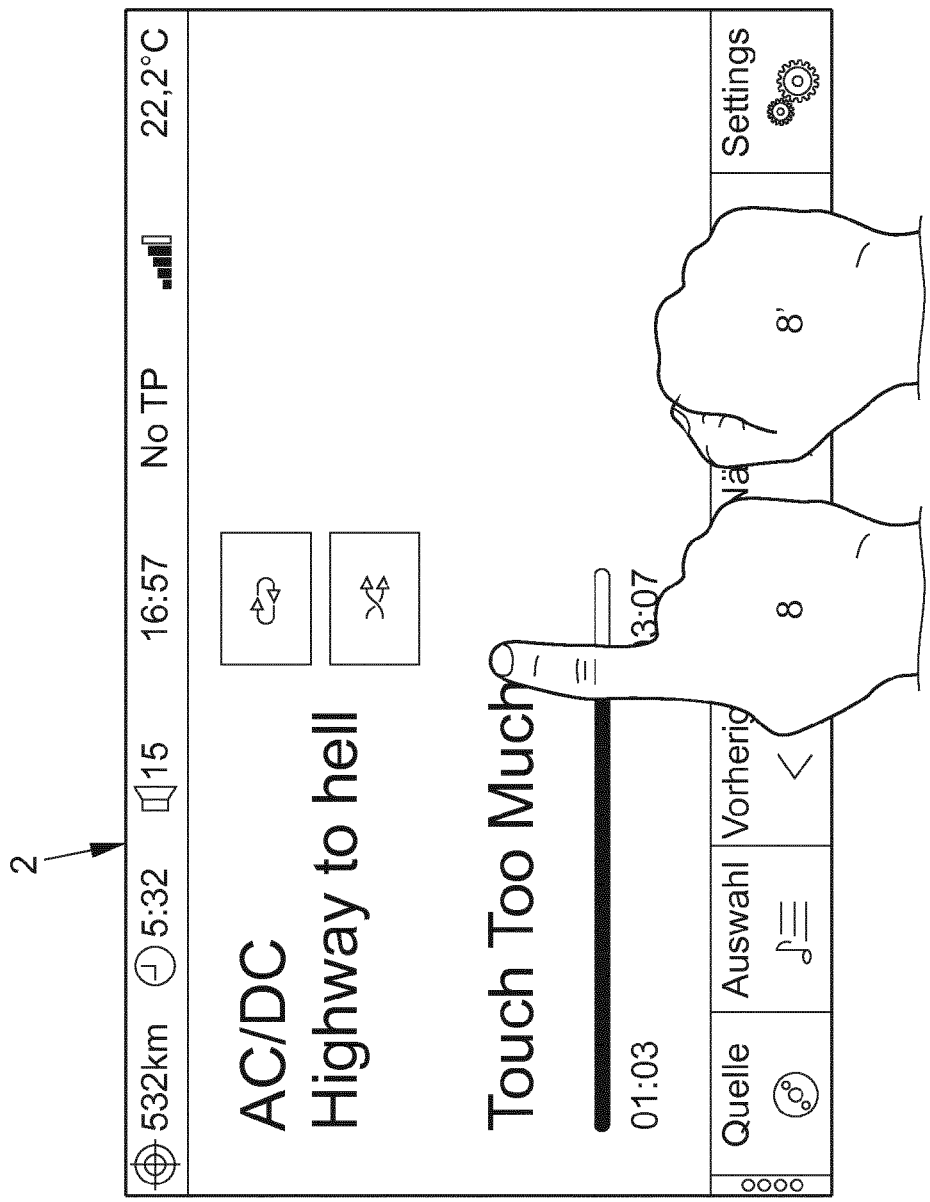
FIG. 10/
Figure 11:
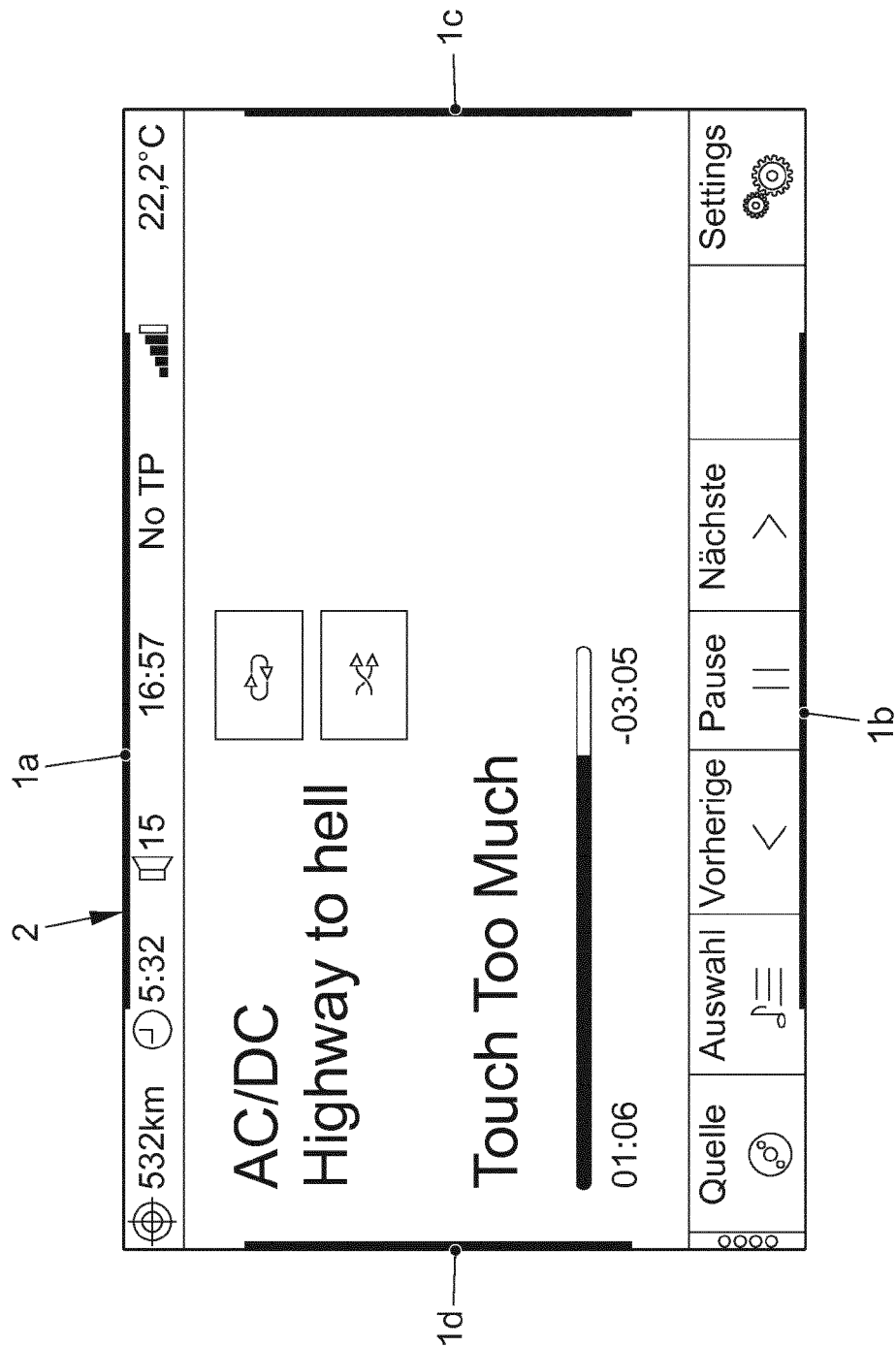
FIG. 11 is an illustration of a second successful function call of a gesture recognized and signaled according to an illustrative embodiment.

FIG. 10 shows an alternate view of a screen 2 in which the hand 8, 8' of a user carries out a tap gesture. The main direction of motion of this tap gesture is oriented into the display level. To differentiate the recognized gesture class, a plurality (e.g., four) visually emphasized positions 1a, 1b, 1c, 1d are provided in the surrounding part 2 of the peripheral area (see FIG. 11). This may be done in the clockwise or counterclockwise direction. For circulating clockwise, position 1a shifts along the upper edge to the right, position 1c along the right edge downward, position 1b along the bottom edge to the left, and position 1d along the left edge upwards. For circulating counterclockwise, the directions of motion are reversed accordingly. The above-described trajectory and the blue color scheme of the visually emphasized positions 1a, 1b, 1c, 1d signal to the user that the successful stopping of the music playback in response to the recognized tap gesture is being (or has been) performed.

Figure 12:
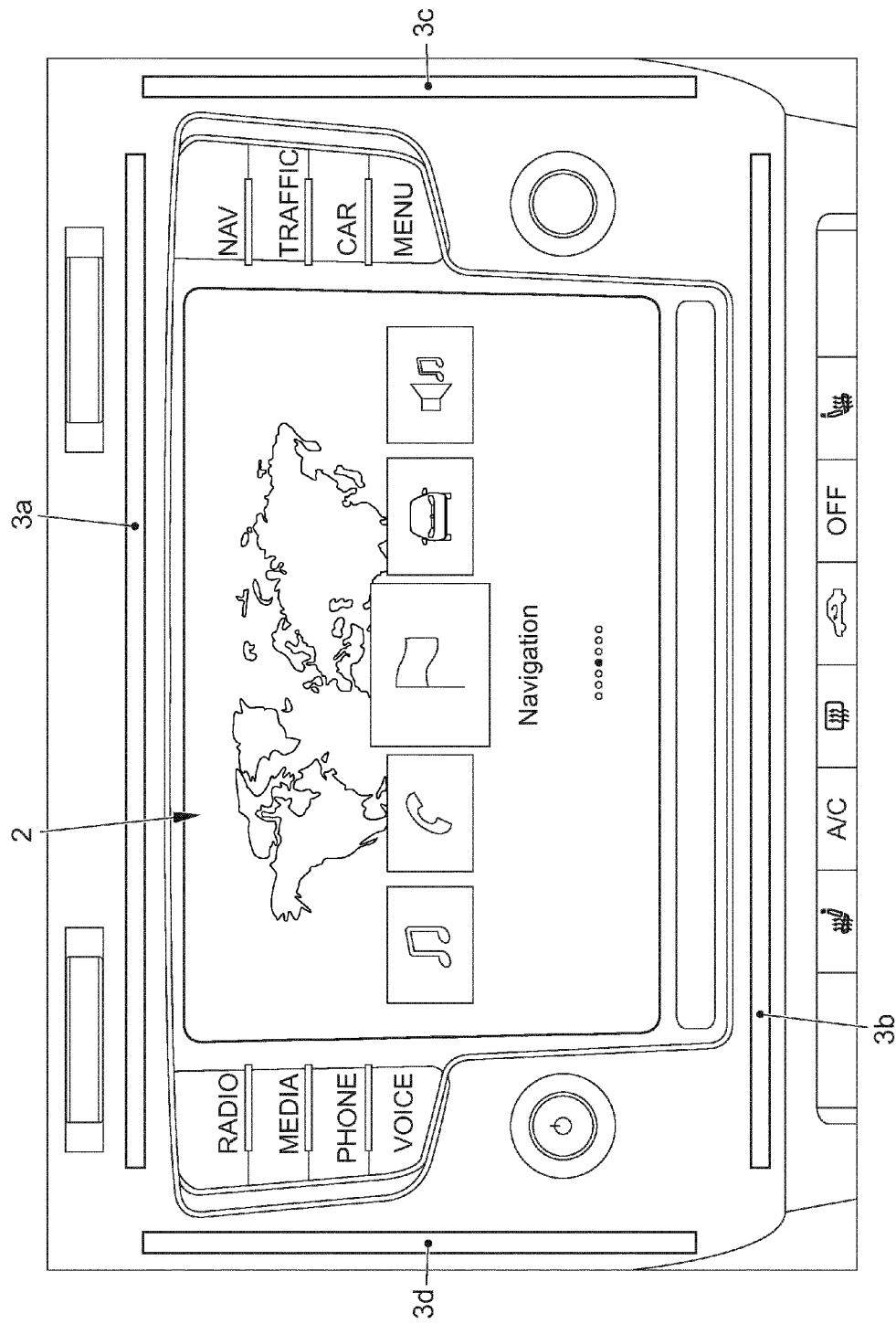
FIG. 12 is a frontal view of an alternative exemplary embodiment of display units according to an illustrative embodiment.

FIG. 12 shows an alternative configuration of the user interface under an illustrative embodiment, wherein screen 2 is surrounded, as the first display unit, by four bar-shaped light-emitting elements 3a, 3b, 3c, 3d. Here, the bar-shaped light-emitting elements 3a, 3b, 3c, 3d extend beyond the borders of the edges of screen 1 and are oriented substantially parallel to the edges. The bar-shaped light-emitting elements 3a, 3b, 3c, 3d may have a thickness of only a few millimeters, making their share of the two-dimensional footprint correspondingly low.

Figure 13:
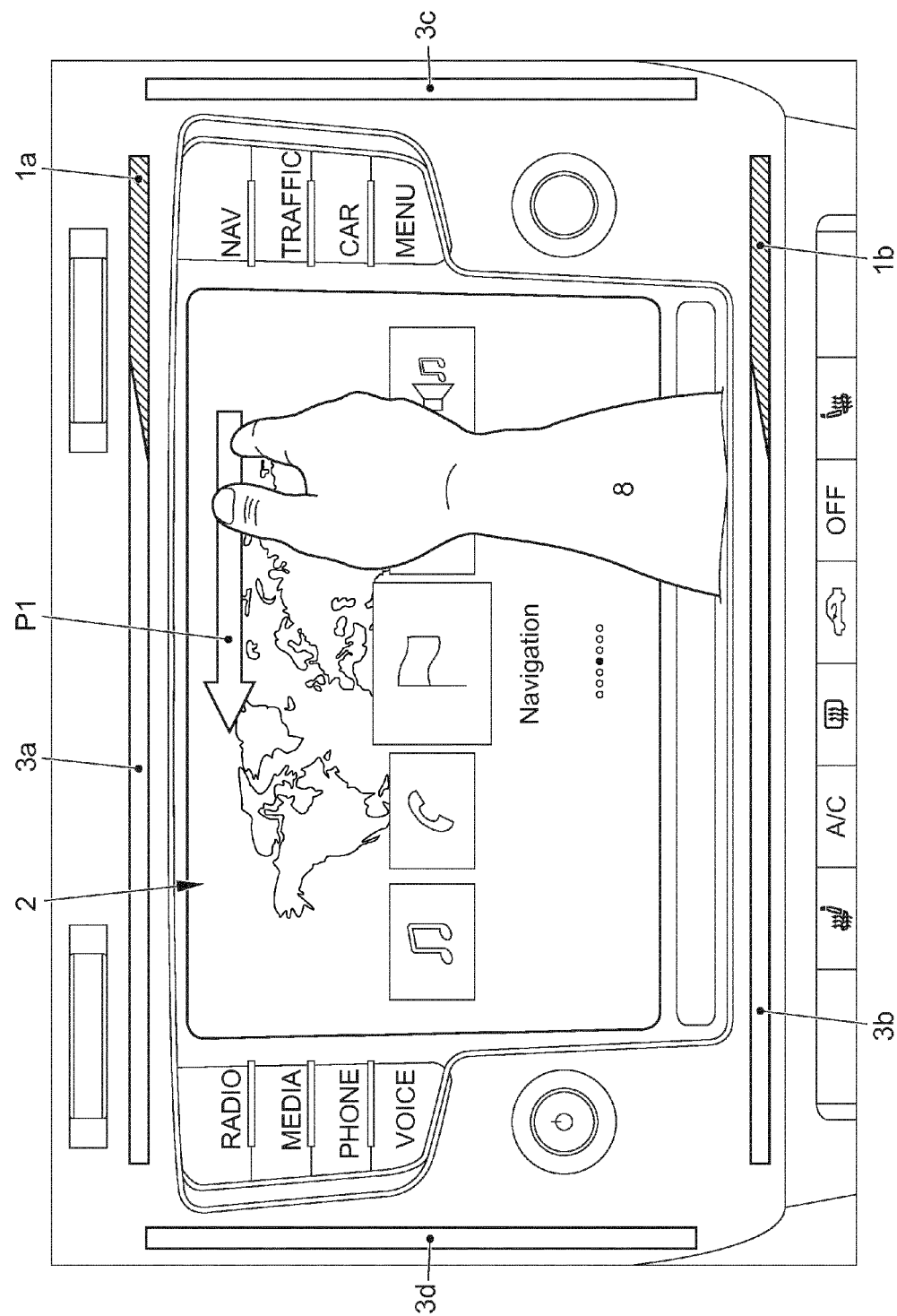
FIG. 13 is an illustration of a successful function call after operating the arrangement as shown in FIG. 12.

In FIG. 13, hand 8 of a user operates the user interface according to an illustrative embodiment by a horizontal swipe gesture P1 that is oriented to the left, in response to which a first bar-shaped light-emitting element 3a disposed above screen 2 and visually emphasizes a first position 1a by a bluish color scheme in an area on the right. Accordingly, a position 1b is visually emphasized by a bluish coloring on its right side on a bar-shaped light-emitting element 3b disposed below screen 2. The vertical bar-shaped light-emitting elements 3c, 3d to the right and left of screen 2 are used only for signaling vertical swipe gestures and gestures, and they are therefore switched off in this example. The course of the animation (or of the position that can change its location) 1a, 1b corresponds to the disclosure in connection with FIGS. 6 and 7 and FIGS. 8 and 9, respectively, as a function of the available menu options.

Although the aspects of the invention and advantageous embodiments have been described in detail by way of the exemplary embodiments with reference to the accompanying figure drawings, modifications and combinations of features of the illustrated exemplary embodiments are apparent to persons skilled in the art and without departing from the protected field of the present invention, the scope of which is defined by the appended claims.

LIST OF REFERENCE NUMERALS 1a, 1b, 1c, 1d Visually emphasized position
2 Screen
3a, 3b, 3c, 3d Bar-shaped light-emitting elements
4 Electronic controller
5 Flash memory
6 Infrared LED strip
8, 8' Hand of the user
10 Vehicle
100, 200, 300, 400, 500, 600 Steps of the method
P1, P2, P3, P4, P5 Gestures

The invention claimed is:

1. A method for signaling a successful gesture input by a user to a processing device, comprising:
   sensing, via the processing device, an inputted gesture from a user in the proximity of the processor apparatus;
   determining, via the processing device, a classification for the inputted gesture; and
   signaling, via the processing device, the determined classification by generating an animation, that visually emphasizes a linearly changing position of at least in a part along an edge of a screen of the processing device assigned to the gesture input; and
   modifying the generated animation, wherein the modification is dependent on if an application-related function can be executed or not in response to the recognized gesture.

2. The method of claim 1, wherein the generating of the animation comprises changing the position parallel to the edge in accordance with a trajectory pre-defined for the determined classification.

3. The method of claim 1, wherein the determining of the classification comprises determining a main direction of motion of the gesture, and wherein the signaling is performed along a trajectory predetermined by a main direction of motion defined by the determined classification.

4. The method of claim 1, wherein the generating the animation comprises generating the animation on at least one of a screen and/or a linear, light-emitting element arranged adjacent to the screen.

5. The method of claim 1, wherein sensing the inputted gesture comprises sensing the gesture from free space.

6. The method of claim 1, wherein the generating of the animation comprises generating an animation area of increased brightness along the linearly changing position.

7. The method of claim 6, wherein the generating of the animation comprises generating an afterglow to the animation area subsequent to the increased brightness.

8. The method of claim 1, wherein the generating of the animation comprises generating a visual extension perpendicular to the direction of the change of position, wherein the visual extension is one of one fifth, one seventh, and one ninth of the extension of the screen in the same direction.

9. The method of claim 1, wherein modifying the generated animation comprises modifying at least one of a color and/or trajectory of the animation.

10. A processing device for signaling a successful gesture input by a user to the processing device, comprising:
- a display unit;
- a sensor system configured to detect an inputted gesture from a user in the proximity of the display unit; and
- an evaluation unit comprising a processor configured to determine a classification for the inputted gesture, wherein the display unit is configured to signal the determined classification by generating an animation that visually emphasizes a linearly changing position of at least in a part along an edge of a screen of the display unit assigned to the gesture input,
- and wherein the display unit is configured to modify the generated animation, wherein the modification is dependent on if an application-related function can be executed or not in response to the recognized gesture.

11. The processing device of claim 10, wherein the display unit is configured to generate the animation by changing the position parallel to the edge in accordance with a trajectory pre-defined for the determined classification.

12. The processing device of claim 10, wherein the classification unit is configured to determine a main direction of motion of the gesture, and wherein the display unit is configured to signal along a trajectory predetermined by a main direction of motion defined by the determined classification.

13. The processing device of claim 10, wherein the display unit is configured to generate the animation on at least one of a screen and/or a linear, light-emitting element arranged adjacent to the screen.

14. The processing device of claim 10, wherein the sensor system is configured to sense the gesture from free space.

15. The processing device of claim 10, wherein the display unit is configured to generate an animation area of increased brightness along the linearly changing position.

16. The processing device of claim 15, wherein the display unit is configured to generate the animation by generating an afterglow to the animation area subsequent to the increased brightness.

17. The processing device of claim 10, wherein the display unit is configured to generate the animation by generating a visual extension perpendicular to the direction of the change of position, wherein the visual extension is one of one fifth, one seventh, and one ninth of the extension of the screen in the same direction.

18. The processing device of claim 10, wherein the display unit is configured to modify the generated animation by modifying at least one of a color and/or trajectory of the animation.

19. A method for signaling a successful gesture input by a user to a processing device, comprising:
- sensing, via the processing device, an inputted gesture from a user in the proximity of the processor apparatus;
- determining, via the processing device, a classification for the inputted gesture; and
- signaling, via the processing device, the determined classification by generating an animation that visually emphasizes a linearly changing position of at least in a part along an edge of a screen of the processing device assigned to the gesture input, by generating an animation area of increased brightness along the linearly changing position.

* * * * *